United States Patent
Cremeans et al.

(10) Patent No.: US 6,186,868 B1
(45) Date of Patent: Feb. 13, 2001

(54) CHILLED TEMPERATURE POLISHING METHOD FOR SOFT ACRYLIC ARTICLES

(75) Inventors: Bryan L. Cremeans, Huntington; Teresa L. Pickett, Barboursville; Jennia Tucker, Huntington, all of WV (US)

(73) Assignee: Alcon Laboratories, Inc., Fort Worth, TX (US)

(*) Notice: Under 35 U.S.C. 154(b), the term of this patent shall be extended for 0 days.

(21) Appl. No.: 09/453,103

(22) Filed: Dec. 2, 1999

Related U.S. Application Data

(60) Provisional application No. 60/114,927, filed on Jan. 5, 1999.

(51) Int. Cl.$^7$ .................................................... B24B 1/00
(52) U.S. Cl. ........................... 451/32; 451/33; 451/34; 451/35; 451/53
(58) Field of Search .................. 451/35, 36, 43, 451/328, 42, 326, 41, 53, 32, 33, 34

(56) References Cited

U.S. PATENT DOCUMENTS

| | | | |
|---|---|---|---|
| 2,554,701 | 5/1951 | Hackett et al. | 51/281 |
| 3,535,159 | 10/1970 | Shiro | 134/1 |
| 3,874,124 | 4/1975 | Morgan et al. | 51/125 |
| 3,997,358 | 12/1976 | Taylor | 134/7 |
| 4,257,196 | 3/1981 | Walther et al. | 51/163.2 |
| 4,580,371 | 4/1986 | Akhavi | 51/313 |
| 4,796,388 | 1/1989 | Steckis | 51/164.1 |
| 5,133,159 | 7/1992 | Nelson | 51/313 |
| 5,290,892 | 3/1994 | Namdaran et al. | 526/259 |
| 5,331,073 | 7/1994 | Weinschenk, III et al. | 526/264 |
| 5,429,838 | 7/1995 | Mansson et al. | 427/2.24 |
| 5,571,558 | 11/1996 | Nguyen et al. | 427/215 |
| 5,674,435 | 10/1997 | Blake | 264/2.7 |
| 5,693,095 | 12/1997 | Freeman et al. | 623/6 |
| 5,766,243 | 6/1998 | Christensen et al. | 623/4 |
| 5,873,770 | 2/1999 | Hashimoto | 451/32 |
| 5,961,370 | 10/1999 | Valle et al. | 451/35 |
| 6,010,391 | * 1/2000 | Lewellen et al. | 451/35 |
| 6,095,901 | * 8/2000 | Robinson et al. | 451/35 |

FOREIGN PATENT DOCUMENTS

| | | |
|---|---|---|
| 169439 | 6/1988 | (JP). |
| WO 93/06967 | 4/1993 | (WO). |
| WO 98/19825 | 5/1998 | (WO). |
| WO 98/19826 | 5/1998 | (WO). |
| WO 98/50199 | 11/1998 | (WO). |

OTHER PUBLICATIONS

Koch, D. Foldable Intraocular Lenses, Slack Incorporated, Thorofare, NJ, (1993), Chapter 8, "Aclon AcrySof™ Acrylic Intraocular Lens," pp. 161–177.

* cited by examiner

*Primary Examiner*—M. Rachuba
(74) *Attorney, Agent, or Firm*—Patrick M. Ryan

(57) ABSTRACT

A method of polishing articles comprising soft acrylic materials is disclosed. The method includes a polishing step and a cleaning step. In the polishing step a receptacle is charged with polishing beads of various sizes, alumina, sodium hydroxide, water, a surfactant, and the articles to be polished, and agitated for a period of time and at a speed sufficient to remove surface irregularities. The polishing step is completed below the glass transition ($T_g$) point of the acrylic article being polished but above 0° C. Following the polishing step, the polished articles are cleaned by rinsing them with water for a period of time to clean the surface of the polished articles.

15 Claims, No Drawings

CHILLED TEMPERATURE POLISHING METHOD FOR SOFT ACRYLIC ARTICLES

This application claims priority from co-pending U.S. Provisional Application Ser. No. 60/114,927, filed Jan. 5, 1999.

BACKGROUND OF THE INVENTION

1. Field of the Invention

The present invention relates to methods of manufacturing products comprising acrylic materials. In particular, this invention relates to methods of polishing soft acrylic articles to remove rough surfaces and tool or machining marks.

2. Description of Related Art

Soft acrylic materials are used in the manufacture of a wide variety of products. Because soft acrylic materials are generally compatible with biological tissues and fluids, they can be particularly useful in making products for biomedical applications. Examples of such soft acrylic products include soft contact lenses and soft prosthetic implants, such as intracorneal and intraocular lenses, corneal inlays used during refractive surgery, and intracapsular rings used to support the natural lens capsule during ophthalmic surgery.

A highly polished finish, free of sharp edges or surface irregularities, is required in many biomedical applications. Implantable products, such as intraocular lenses, are in direct contact with body tissues and the tearing or abrading of tissue by rough surfaces could result in rupture of blood vessels, irritation or other trauma to the tissue. Even minute irregularities can cause irritation of body tissues. This is a particularly serious problem with contact lenses and portions of intraocular lenses that contact the eye, where the tissue is extremely sensitive.

The use of soft acrylic materials for intraocular lenses is a relatively new development. Intraocular lenses formed of soft acrylic material are advantageous in that they can be folded and inserted through smaller incisions in the cornea than previously possible, resulting in fewer post-operative complications. Rough edges resulting from the cutting of lens blanks or flashing generated during molding can cause intraocular irritation.

In addition, soft contact lenses require a highly polished finish to prevent irritation of the interior of the eyelid and corneal epithelium. The eye is extremely sensitive to imperfections in contact lenses, and even slight ridges resulting from the molding process can produce irritation and discomfort. Expensive molding procedures or individual hand-grinding techniques may be used to provide the desired finish for these lenses.

Mechanical devices utilizing smooth, frictionless movement also require highly polished, smooth surfaces of their soft acrylic products. Obtaining such a highly polished, smoothly-finished soft acrylic article is often difficult as these products are manufactured by curing acrylic material in molds, wherein even the most precise dies result in some flashing and/or irregular edges. The products may be trimmed and polished, but these finishing procedures are generally done by hand, and are both time consuming and expensive, as well as imprecise, so that they do not result in the totally smooth or regular surface required. Further, many of these articles, particularly those for biomedical applications, are relatively small, and/or irregularly shaped, causing difficulties in the desired finish, and/or clarity.

For silicone materials, such as silicone rubber and silicone elastomers, tumble polishing processes are known. See, for example, U.S. Pat. No. 5,133,159. However, the tumble polishing methods known for articles made from silicone materials are not adequately applicable to articles made from soft acrylic materials. The removal of imperfections from small and irregularly shaped soft acrylic products is an unsolved problem in the art. It would be of great utility to provide a simple, economic, and effective method for polishing and/or clarifying soft acrylic articles for industrial, medical, and mechanical purposes.

Commonly assigned, copending U.S. patent application Ser. No. 08/962,604 discloses methods for tumble polishing soft acrylic articles. The methods comprise a cryogenic polishing step and a cleaning step. Commonly assigned, copending U.S. patent application Ser. No. 60/068,201 discloses a tumble polishing method for soft acrylic articles comprising polishing and cleaning steps, wherein the polishing step may be conducted at room temperature.

SUMMARY OF THE INVENTION

The present invention provides methods for polishing articles comprising soft acrylic materials. The methods comprise two steps: a polishing step and a cleaning step. The polishing step comprises charging a receptacle with a polishing slurry and the articles to be polished, and agitating the receptacle for a period of time and at a speed sufficient to remove surface irregularities from the articles. The polishing slurry comprises polishing beads, alumina, sodium hydroxide, a surfactant and water. The polishing step is carried out under chilled conditions.

After polishing, the articles may contain alumina particles or a surface film or other residue causing a hazy or contaminated appearance. Any alumina particles or other residue is removed in the cleaning step. The cleaning step comprises rinsing the polished article with water for a period of time sufficient to clean the surface of the polished articles.

Examples of articles that may be polished according to the methods of the present invention include ophthalmic lenses and implants, such as one-piece intraocular lenses, intraocular lens haptics, intraocular lens optics, intracapsular rings, corneal inlays, intracorneal lenses, and contact lenses.

DETAILED DESCRIPTION OF THE INVENTION

Unless indicated otherwise, all amounts of composition ingredients expressed in percentage terms are expressed on a weight/weight basis.

The present invention provides methods for polishing articles comprising soft acrylic materials. As used herein, "soft acrylic material" means material comprising polymers or copolymers of acrylic acid, methacrylic acid, esters of these acids, or acrylonitrile, wherein the polymers or copolymers have a glass transition temperature ($T_g$) of about 35° C. or less, and a Shore A Hardness value of about 90 or less. Preferably the soft acrylic materials have a $T_g$ of about 25° C. or less, and most preferably 20° C. or less. The soft acrylic materials preferably have a Shore A Hardness value of about 60 or less, and most preferably about 45 or less.

Examples of soft acrylic materials suitable for making foldable intraocular lenses include but are not limited to (i) the acrylic material made from copolymerizing about 65% 2-phenylethyl acrylate, about 30% 2-phenylethyl methacrylate, an ultraviolet absorber and a cross-linking agent, and (ii) the acrylic material made from copolymerizing about 80% 2-phenylethyl acrylate, about 15% 2-hydroxyethyl methacrylate, an ultraviolet absorber and a cross-linking agent. These and other suitable soft acrylic materials are described in U.S. Pat. Nos. 5,290,892 and 5,693,095. Other examples of soft acrylic materials include, but are not limited to, those disclosed in U.S. Pat. No. 5,331,073.

As used herein, the "Preferred Acrylic Material" means the soft acrylic material obtained by copolymerizing about 65% 2-phenylethyl acrylate, about 30% 2-phenylethyl methacrylate, about 1.8% o-methallyl Tinuvin P and 3.2% 1,4-butanediol diacrylate, using 1.8% Perkadox 16 as an initiator.

The present methods comprise a polishing step and a cleaning step. The polishing step is conducted under chilled conditions. As used herein, "chilled conditions" means at temperatures above 0° C. but below the $T_g$ of the soft acrylic material. The polishing step is conducted at a temperature below the soft acrylic material's glass-transition temperature to insure that the article being polished is hard and at least non-flexible to aid in the removal of any frosty edges or milling marks. Preferably, the polishing step is conducted at a temperature about 10° C. or more below the $T_g$ of the soft acrylic material. Most preferably, the polishing step is conducted at a temperature about 15° C. or more below the $T_g$ of the soft acrylic material.

In the polishing step, a receptacle is charged with a polishing slurry and the articles to be polished. The receptacle may be various shapes and sizes, and may be formed of glass, polycarbonate or other suitable material. The receptacle is preferably a square plastic container, such as a 1 liter Nalgene® square jar.

The polishing slurry comprises a mixture of polishing beads, alumina, sodium hydroxide, and a surfactant. As one skilled in the art will appreciate, however, the exact composition of the polishing slurry will vary depending on a variety of factors, such as the identity of the acrylic material and the size and shape of the article to be polished.

Preferably, the polishing beads are glass beads, which are relatively inexpensive and readily commercially available, but may be solid or filled beads formed of any suitable material. Commercially available glass beads are available in a variety of sizes, for example 0.3-, 0.4-, 0.5-, 0.6-, 1- and 2-mm sizes. The glass beads contained in the polishing slurring have preferably been preconditioned so that they are not in a raw state; that is, they have preferably been slightly worn or conditioned so that they are less likely to harm the surface of the lens.

One way to condition raw glass beads received from commercial suppliers is to sequentially tumble the beads in acidic (e.g., 2N HCL for 3 days) and basic (1% NaOH for 7 days) washing solutions, respectively. After their rough surfaces have been slighly worn, the beads may be utilized in the polishing step.

The necessary number and size distribution of polishing beads will vary with the number and size of the articles to be polished, but a suitable selection can easily determined without undue experimentation. Generally, a mixture of polishing beads of different sizes is preferred. In the case of the Preferred Acrylic Material, for example, the polishing slurry would comprise 0.6 mm, 1.0 mm and 2.0 mm glass beads in a 1:2:1 ratio. For example, the polishing beads added to a 1 liter receptacle would comprise approximately 1184 g of polishing beads as follows: about 296 g of 0.6 mm glass beads, and about 592 g of 1.0 mm glass beads, and about 296 g of 2.0 mm glass beads.

The polishing slurry also contains alumina as a polishing agent. Alumina polishing powder is commercially available in two forms: α-shaped (plate-like) and γ-shaped (cube-like) particles. It is essential that the alumina used in the methods of the present invention be γ-shaped to avoid excessive haziness or surface damage to the polished article. Accordingly, unless indicated otherwise, as used herein "alumina" means γ-shaped alumina. Available mesh sizes of alumina range from less than 0.05 μm to 3.0 μm and larger. The optimum amount and mesh size of alumina will depend on other process parameters, including the identity of the soft acrylic material. In general, however, the polishing slurry contained in a 1 liter receptacle will require a minimum of approximately 0.1% alumina to water content to achieve satisfactory results, preferably at least 0.2% alumina to water content, regardless of the size and shape of the articles to be polished. High concentrations of alumina, such as those greater than about 2% alumina to water, for example, may result in damage to the article(s) being processed. Generally, relatively low concentrations will suffice. Even if greater concentrations do not damage the articles, they do not appear to provide any significant improvement in polishing efficiency or results. In the case of the Preferred Acrylic Material, the polishing slurry contains about 0.2% of 0.05 μm alumina to water content.

In addition to polishing beads and alumina, the polishing slurry also comprises water (preferably de-ionized water), sodium hydroxide, and a surfactant. The sodium hydroxide, which can be added to the polishing slurry in solid or solution form, acts to control the pH of the slurry during polishing; thereby, facilitating and improving the polishing results. The amount of sodium hydroxide contained in the polishing slurry should be that amount which is sufficient to control the pH at about 10 or higher.

A surfactant is used to enhance the polishing action and provide an improved finish on the article being polished. Suitable surfactants for use in the slurry are those that dissolve in water and aid in suspending the alumina particles in the slurry. The concentration of surfactant in the polishing slurry is less than about 1% (surfactant to water). Increasing the amount of surfactant above about 1% may cause the slurry to become excessively soapy or foamy, reducing the effectiveness of the polishing process. The preferred amount of surfactant in the slurry is about 0.03% (surfactant to water). The preferred surfactant for use with acrylic materials is Micro 90® detergent, a commercially available surfactant.

The water serves as the medium for the alumina and polishing beads. In general, a suitable amount of water is that amount which is sufficient to cover the standing volume of polishing beads contained in the polishing slurry. Thus, in a 1-liter receptacle containing approximately 1184 g of glass polishing beads, the preferred polishing slurry for the Preferred Acrylic Material comprises about 270 ml of deionized water.

The polishing slurry is preferably formulated in the receptacle in the absence of polishing beads and the acrylic articles that are to be polished. For example, polishing ingredients consisting of alumina, deionized water, sodium hydroxide, and surfactant are mixed together in a glass flask. These ingredients, once mixed thoroughly, can then be dispensed into a polishing jar (already containing the major amount of the water and the polishing beads).

Once the articles to be polished are added to the polishing slurry, the receptacle is agitated for a time and at a speed sufficient to remove any rough spots, sharp edges, and any tool or machining marks from the articles' surface. Agitation is preferable accomplished by placing the receptacle on a rotational apparatus. The rotation apparatus can be a closed unit, or inside an area, that is refrigerated. The optimal time and rotation speed may vary with the batch size, identity of the soft acrylic material, the size and shape of the articles to be polished, the edge quality of the article being polished, etc. When the methods of the present invention are used to polish intraocular lenses, a typical batch size will be on the order of 50–100 lenses for a 1-liter receptacle. In the case of the Preferred Acrylic Material, excellent polishing results are obtained when the article is tumble-polished for approximately 3–10 days, with the rotation speed of the receptacle being approximately 120 rpm. The temperature during polishing should be maintained above 0° C. but below the $T_g$ of the soft acrylic material.

After the polishing step, the articles may be separated from the polishing beads by emptying the contents of the polishing jar into a sieve stack so that the articles are gently separated from the polishing materials. The articles then may be rinsed by flushing with water to separate them from the beads. After the articles are separated from the beads, any alumina particles and any surface residue on the articles are removed in a cleaning step. The cleaning step comprises rinsing the polished articles with water for a time sufficient to remove all or substantially all of the alumina particles or surface residue. Preferably, the rinsing water is deionized water and is chilled (i.e., above 0° C. but below the $T_g$ of the soft acrylic material) in order to minimize or prevent the articles from clumping together during the cleaning step. The cleaning step is preferably accomplished using spray rinsing and a programmable logic controller. After the cleaning step, the polished articles should appear optically clear, very clean and smooth with little or no cosmetic blemishes.

Certain embodiments of the present invention are illustrated in the following example.

EXAMPLE 1

Tumble Polishing of Intraocular Lenses

Preferred Acrylic Material

A 1000-ml square plastic tumbling jar was filled with approximately 1184 g of a mixture of preconditioned glass polishing beads. The mixture contained approximately 25% 0.6 mm, 50% 1.0 mm, and 25% 2.0 mm glass beads. Deionized water was added to the tumbling jar until the beads were covered with water (about 270 ml). The jar was then placed in a refrigerator in queue for use. A polishing media was then formulated by preparing a solution containing about 0.7 g of 0.05 micron alumina polishing powder, 2.1 g of sodium hydroxide, 4 ml of 2% Micro® 90 detergent and 27 ml deionized water. This solution was then mixed thoroughly in a glass flask (approximately 30 minutes using a magnetic bar stirrer) and dispensed into the refrigerated polishing jar. The tumbling machine was set at 120 rpm and refrigerator set to maintain a polishing temperature below 18° C. About 100 one-piece intraocular lenses made from the Preferred Acrylic material were added to the prepared tumbling jar. The jar was then placed on the tumbling machine and tumbled for 5 days. After tumbling, the jar was removed and its contents were poured into a sieve to separate the lenses from the glass beads. The lenses were then rinsed with chilled (4° C.) deionized water for 3.5 minutes, and air dried. Sample lenses were inspected at 16× for roundness and surface finish quality. They appeared highly polished. All machining lines had been removed and the optic and haptic edges were smooth and rounded.

The invention has been described by reference to certain preferred embodiments: however, it should be understood that it may be embodied in the other specific forms or variations thereof without departing from its spirit of essential characteristics. The embodiments described above are therefore considered to be illustrative in all respects and not restrictive, the scope of the invention being indicated by the appended claims rather than by the foregoing description.

What is claimed is:

1. A method of polishing an article comprising a soft acrylic material, wherein the method comprises
   a) polishing the article by charging a receptacle with a polishing slurry and the article to be polished, and agitating the receptacle for a period of time and at a speed sufficient to remove surface irregularities from the article, wherein (i) the polishing slurry has a pH of 10 or higher and comprises polishing beads, alumina, sodium hydroxide, a surfactant and water; and (ii) the polishing step is conducted at a temperature above 0° C. and below the $T_g$ of the soft acrylic material; and
   b) cleaning the polished article by contacting it with water for a time sufficient to clean the surface of the article.

2. The method of claim 1 wherein the polishing beads are glass beads.

3. The method of claim 2 wherein the polishing beads comprise 0.6 mm, 1.0 mm, and 2.0 mm glass beads in a 1:2:1 ratio.

4. The method of claim 1 wherein the amount of alumina in the slurry is about 0.1 to 2% (alumina to water).

5. The method of claim 4 wherein the amount of alumina in the polishing slurry is at least about 0.2% (alumina to water).

6. The method of claim 1 wherein the size of the alumina is from about 0.05–3.0 μm.

7. The method of claim 6 wherein the size of the alumina is about 0.05 μm.

8. The method of claim 1 wherein the temperature during polishing is maintained at least 10° C. or more below the $T_g$ of the soft acrylic material.

9. The method of claim 6 wherein the temperature during polishing is maintained at least 15° C. or more below the $T_g$ of the soft acrylic material.

10. The method of claim 1 wherein the amount of surfactant in the polishing slurry is less than about 1% (surfactant to water).

11. The method of claim 8 wherein the amount of surfactant is about 0.03% (surfactant to water).

12. The method of claim 1 wherein the water used in step (b) is deionized water at a temperature above 0° C. and below the $T_g$ of the soft acrylic material.

13. The method of claim 1 wherein the article is selected from the group consisting of ophthalmic lenses and implants.

14. The method of claim 9 wherein the article is selected from the group consisting of one-piece intraocular lenses, intraocular lens haptics, intraocular lens optics, intracapsular rings, corneal inlays, intracorneal lenses, and contact lenses.

15. A soft acrylic article polished according to the method of claim 1.

* * * * *